United States Patent [19]

Tabar et al.

[11] 4,362,840

[45] Dec. 7, 1982

[54] SOFT, HEAT AND FATIGUE RESISTANT ELASTOMERIC ARTICLES

[75] Inventors: Ronald J. Tabar, Amherst, Mass.; Paul C. Killgoar, Jr., Livonia; Marvin A. Lemieux, Southfield, both of Mich.

[73] Assignee: Ford Motor Company, Dearborn, Mich.

[21] Appl. No.: 192,781

[22] Filed: Oct. 1, 1980

[51] Int. Cl.³ .............................................. C08K 3/04
[52] U.S. Cl. ......................................... 524/525; 16/2; 524/526; 525/124; 525/125; 525/232; 525/236
[58] Field of Search ............... 525/232, 236, 124, 125; 260/5, 42.32, 42.38; 524/525, 526; 16/2

[56] References Cited

U.S. PATENT DOCUMENTS

| | | | |
|---|---|---|---|
| 2,138,895 | 12/1938 | Wiezevich | 106/23 |
| 2,160,204 | 5/1939 | Gibbons | 174/125 |
| 2,160,996 | 6/1939 | Wiezevich | 260/4 |
| 2,184,966 | 12/1939 | Wiezevich | 260/4 |
| 2,194,958 | 3/1940 | Szegvari et al. | 260/759 |
| 2,202,363 | 5/1940 | Wiezevich | 260/4 |
| 2,218,167 | 10/1940 | Harkins | 260/4 |
| 2,253,255 | 10/1941 | MacKenzie | 260/4 |
| 2,330,698 | 9/1943 | Fisher | 260/4 |
| 2,373,613 | 4/1945 | Szegvari et al. | 260/3 |
| 3,060,989 | 10/1962 | Railsback et al. | 260/42.38 |

OTHER PUBLICATIONS

Vistanex Polyisobutylene Properties and Applications, Exxon Chemicals, 1974, pp. 1 and 20.

Primary Examiner—Wilbert J. Briggs, Sr.
Assistant Examiner—Herbert J. Lilling
Attorney, Agent, or Firm—Lorraine S. Melotik; Roger L. May

[57] ABSTRACT

A soft, heat and fatigue resistant vulcanizate adapted for transmitting load between moving mechanical parts comprising (a) 100 parts by weight of crosslinked elastomer consisting essentially of (i) natural or synthetic polyisoprene rubber, and (ii) elastomeric polybutadiene made from monomers consisting essentially of butadiene at a weight ratio of (i) to (ii) of about 1:10 to 10:1, (b) about 10-75 parts by weight of substantially internally saturated, substantially linear polymer that (i) is made from monomers consisting essentially of isobutylene, (ii) is a strain crystallizable, elastic solid at 20° C. and (iii) has a viscosity average molecular weight (Flory) above about 1.3 million, (c) said elastomer being crosslinked with a curative comprising a curing agent selected from the group consisting of (i) a sufficient amount of sulfur to provide an efficient or semi-efficient vulcanization of said crosslinkable elastomer, (ii) isocyanate or blocked isocyanate in an amount sufficient to crosslink said crosslinkable elastomer and (iii) isocyanate or blocked isocyanate and sulfur in amounts sufficient to crosslink said crosslinkable elastomer and (d) 5-200 parts by weight particulate comprising carbon black, wherein said polymer of (b) is dispersed throughout said elastomer of (a) in a discrete microscopic phase.

11 Claims, 15 Drawing Figures

SOFT, HEAT AND FATIGUE RESISTANT ELASTOMERIC ARTICLES

BACKGROUND OF THE INVENTION

This invention relates to (i) a method of preparing soft, fatigue resistant, elastomeric articles for transmitting load between moving mechanical parts through incorporation of certain isobutylene polymers, and (ii) articles prepared thereby. This invention, in preferred embodiments, relates to (i) a method of preparing soft, heat and fatigue resistant, elastomeric articles for transmitting load between moving mechanical parts comprising such isobutylene polymers and other essential ingredients and (ii) articles prepared thereby.

Elastomeric articles of the type to which the invention applies have diverse applications. Vehicular applications include, for example, suspension components such as front or rear suspension bushings, engine mounts, etc. Elastomeric articles or parts in these applications receive and transmit loads between mechanical components in relative motion with one another. The elastomeric articles, accordingly, require an optimal fatigue resistance as well as other desired properties.

It would be desirable in certain circumstances that the elastomeric articles or parts also be soft. For example, it would be desirable to have a vehicular suspension bushing that had lower hardness as compared to traditional suspension bushings. The lower hardness could alter favorably vehicle ride characteristics in, for example, lighter, smaller vehicles.

Physical alteration of an elastomeric part of this type so as to make it softer may have concommittant drawbacks. For example, an increase in the size of the elastomeric parts (e.g., bushing) generally reduces stiffness because, for a given deflection, the part will be under a smaller strain; an increase in size, however, is inconsistent with an objective of lighter, smaller vehicles. Moreover, introduction of holes into the elastomeric article also reduces stiffness; the holes, however, may introduce stress concentrations in the article.

An alternative is to formulate a soft elastomeric article; even here, however, there is difficulty. For example, traditional fatigue tests apply constant load or constant strain to an elastomeric article test sample. In a comparison between test samples of unequal moduli under constant, repetitively applied loads, the softer test sample undergoes greater strain; it, therefore, receives higher energy input. On the other hand, a constant strain test is more severe on the harder sample because an equal amount of strain in the harder sample requires greater energy input.

Test conditions that approximate equal energy inputs to hard and soft samples better compare basic fatigue life of the samples. Under such conditions, it has been found that certain elastomeric articles formulated to be soft do not have comparable fatigue life to harder production counterparts.

An exception to usually diminished fatigue life of soft elastomeric articles of the above described type now has been discovered. Certain polymers of isobutylene have been found, at certain levels, not only to permit softer elastomeric articles or parts but, also, to give articles with desired fatigue life.

This invention may be practiced fully without any appreciation of the theoretical principles underlying such a discovery. Indeed, this invention should not be limited by any characterization of such principles. It is believed, however, that the isobutylene polymer crystallizes during strain of the article. The strain induced crystals prevent or reduce crack or other flaw propagation. Prevention or reduction of flaw propagation enhances fatigue life. At the same time, the relative inertness of the isobutylene polymer to crosslinking allows it to soften the elastomeric article.

It is an object of this invention to provide soft elastomeric articles for transmitting loads between parts suitable for fatigue producing applications.

An additional, but independent, aspect of this invention is provision of soft, fatigue and heat resistant elastomers. In smaller vehicles, for instance, elastomeric articles may be closer to engine or engine related components. Thus, the elastomeric part may be exposed to high temperatures for prolonged periods.

In accordance with this additional aspect of this invention, it has been discovered that certain isobutylene polymers may be formulated with natural or synthetic polyisoprene rubber and elastomeric polybutadiene as well as other ingredients to yield a soft elastomeric article that meets or exceeds many commercially available goods in certain fatigue and heat resistant properties.

Accordingly, it is an additional, independent object of this invention to provide soft, heat and fatigue resistant, elastomeric articles for transmitting loads between mechanical parts.

This invention accomplishes these and other objects as will be apparent to those in the art from the disclosure hereinafter set forth.

BRIEF DESCRIPTION OF THE INVENTION

This invention relates to a method of preparing a soft, fatigue resistant, elastomeric article for transmitting loads between moving mechanical parts. The method comprises:

A. Providing an intimately admixed dispersion comprising (a) 100 parts by weight of crosslinkable elastomer; (b) a fatigue enhancing amount of a substantially internally saturated, substantially linear polymer that (i) is made from monomers consisting essentially of isobutylene, (ii) is a strain crystallizable elastic solid at 20° C. and (iii) has a viscosity average molecular weight (Flory) above about 1.3 million; (c) about 5–200 parts by weight particulate and (d) a curative in an amount sufficient to crosslink the elastomer; and B. Maintaining the dispersion at a temperature sufficient to crosslink the elastomer.

The elastomeric articles of this invention include soft, fatigue resistant, vulcanizates which comprise 100 parts by weight crosslinked elastomer having dispersed throughout in a discrete microscopic phase about 10–75 parts by weight of substantially internally uncrosslinked, substantially linear polymer of aforementioned characteristics. The vulcanizates have application as, for example, suspension bushings having a Shore A hardness below about 60, e.g., 40–50.

A preferred embodiment of this invention is a method of preparing a soft, heat and fatigue resistant, elastomeric article for transmitting loads between moving mechanical parts. This method comprises: A. providing an intimately admixed dispersion comprising (a) 100 parts by weigh of crosslinkable elastomer consisting essentially of (i) natural or synthetic polyisoprene rubber and (ii) elastomeric polybutadiene made from monomers consisting essentially of butadiene at a weight ratio of (i) to (ii) of about 1:10 to 10:1, (b) about 15–55 parts by weight of the aforementioned substantially internally saturated, substantially linear polymer; (c) curative comprising a curing agent selected from the group consisting of (i) a sufficient amount of sulfur to provide an efficient or semi-efficient vulcanization of the crosslinkable elastomer, (ii) isocyanate or blocked isocyanate in an amount sufficient to crosslink the crosslinkable elastomer and (iii) isocyanate or blocked isocyanate and sulfur in amounts sufficient to crosslink the crosslinkable elastomer and (d) about 5–200 parts by weight reinforcing particulate; and B. maintaining the dispersion at a temperature sufficient to cure the elastomer.

Additionally, this invention relates to a soft, fatigue resistant carbon black reinforced vulcanizate adapted for transmitting a load between moving mechanical parts comprising 100 parts by weight crosslinked elastomer having about 15–35 parts by weight of substantially internally uncrosslinked, substantially linear polymer that (i) is made from monomers consisting essentially of isobutylene, (ii) is an elastic solid at 20° C. and (iii) has a viscosity average molecular weight (Flory) above about 1.3 million in a disperse phase consisting essentially of particles of the polymer below about 2 micrometers in diameter.

More particularly and preferably, this invention relates to a soft, heat and fatigue resistant vulcanizate adapted for transmitting a load between moving mechanical parts comprising (a) 100 parts by weight crosslinked elastomer consisting essentially of (i) natural or synthetic polyisoprene rubber and (ii) elastomeric polybutadiene made from monomers consisting essentially of butadiene at a weight ratio of (i) to (ii) of about 1:10-10:1; (b) about 15–55 parts by weight of substantially internally uncrosslinked, substantially linear polymer that (i) is made from monomers consisting essentially of isobutylene, (ii) is a strain crystallizable, elastic solid at 20° C. and (iii) has a viscosity average molecular weight (Flory) above about 1.3 million, the elastomer being crosslinked with (c) a curative comprising a curing agent selected from the group consisting of (i) sulfur in an amount sufficient to provide an efficient or semi-efficient vulcanization of the elastomer (ii) isocyanate or blocked isocyanate in an amount sufficient to crosslink the elastomer and (iii) isocyanate or blocked isocyanate and sulfur in amounts sufficient to crosslink the elastomer and (d) about 5–200 parts by weight particulate wherein the polymer of (b) is dispersed throughout the elastomer of (a) in a discrete miscroscopic phase.

DETAILED DESCRIPTION OF THE INVENTION

The crosslinkable elastomer employed in preparation of articles of this invention preferably comprises natural or synthetic polyisoprene rubber, more preferably natural rubber. Natural rubber strain crystallizes and, accordingly, is exceptionally suited for fatigue producing applications.

In fatigue producing applications where high heat resistance also is sought, the articles of this invention have a crosslinkable elastomer that preferably further comprises elastomeric polybutadiene and certain other ingredients.

Elastomeric polybutadiene is commercially available; it is made by either solution or emulsion polymerization. Preferred polybutadiene is made from monomers consisting essentially of butadiene. An especially preferred polybutadiene has a cis content greater than 50% by weight, more preferably a cis content at least about 98% by weight.

Other crosslinkable elastomers, however, particularly strain crystallizable elastomers, may replace the natural or synthetic polyisoprene rubber. For example, polychloroprene is strain crystallizable, although less than natural rubber, and may be softened. Still other crosslinkable elastomers include bromobutyl rubber as well as amorphous elastomers, e.g., nitrile elastomers. These elastomers may likewise be softened by the isobutylene polymers of this invention.

As mentioned, elastomeric polybutadiene and natural rubber are together in preferred embodiments; these embodiments offer an optimally heat resistant as well as soft, fatigue, resistant elastomeric article. In these preferred embodiments, the curatives are preferably of certain character, as will be mentioned hereinafter.

The elastomeric articles of this invention have certain strain crystallizable, isobutylene polymers that soften the articles in fatigue enhancing amounts. Preferably, about 10–75 parts by weight per 100 parts by weight of the aforementioned crosslinkable elastomer in the articles comprises this polymer. In certain formulations, it has been found that more desirable fatigue resistant properties occur, particularly with reinforcing filler, at between about 15–55, more preferably between about 15–35 parts by weight of the polymer per 100 parts of the crosslinkable elastomer. For polybutadiene containing articles of this invention, an especially preferred range of isobutylene polymer is between about 26–34 parts per 100 parts of crosslinkable elastomer.

The polymer which softens as well as maintains or improves fatigue resistance of the elastomeric article is a substantially internally saturated, substantially linear polymer made from monomers consisting essentially of isobutylene, is a strain crystallizable elastic solid at room temperature, and has a viscosity average molecular weight (Flory) above about 1.3 million, more preferably above about 1.5 million, and an especially preferred range of between about 1.8 and about 2.5 million. The polymers of isobutylene may be terminally unsaturated. They are commercially available polymers. For example, Exxon markets several grades of polyisobutylene polymer as Vistanex polyisobutylene. Of these terminally unsaturated polymers, those with viscosity average molecular weights (Flory) between about 2.0 and about 2.2 million are especially preferred at the above indicated preferred amounts.

The elastomeric articles of this invention also preferably comprise organic or inorganic particulate. Examples of preferred organic and inorganic particulate include carbon blacks, zinc oxide, fine particle calcium carbonate, silicas and silicates. Preferably, the particulate comprises reinforcing particulate such as carbon black. Other, nonreinforcing particulates may also be suitably employed to modify or extend the elastomeric articles.

Particulate levels range desirably between about 5-200 parts by weight per 100 parts by weight crosslinkable elastomer. Preferred carbon black levels range between about 5-200 parts by weight, more preferably about 20-80 parts by weight. The level of carbon black has been determined to affect hardness; elastomeric articles with a Shore A hardness below about 60, normally have less than 200 parts by weight carbon black, preferably up to about 75 parts by weight. Preferred carbon blacks comprise carbon blacks having an average particle size between about 20-100 millimicrons. Also, preferred carbon blacks have a dibutyl phthalate absorption (cc/100 g) of about 70-120.

Combinations of reinforcing particulates may be suitably employed. For example, the reinforcing filler may comprise carbon black and finely divided silica at equal amounts by weight.

As long as the curative for the elastomer does not crosslink the substantially saturated portion of the polymer made from isobutylene, there is little limitation to the type of curative that may be suitably employed. For example, conventional sulfur vulcanization (i.e., relatively high levels of sulfur to accelerator) may be used to prepare soft vulcanizates of excellent fatigue resistance in accordance with this invention.

For soft, fatigue and heat resistant elastomeric articles, the curative preferably comprises a curing agent selected from the group consisting of (i) sulfur (elemental or otherwise), (ii) isocyanate or blocked isocyanate and (iii) isocyanate or blocked isocyanate and sulfur (elemental or otherwise).

With respect to sulfur containing curatives (i), the sulfur is preferably used in an amount sufficient to provide efficient or semi-efficient vulcanization of the crosslinkable elastomer, more preferably, semi-efficient vulcanization. The isocyanate or blocked isocyanate may be used at conventional levels, e.g., an amount sufficient to crosslink the crosslinkable elastomer. The isocyanate or blocked isocyanate and sulfur, more preferably employed in this invention, are used desirably so that the isocyanate or blocked isocyanate is predominant, as hereinafter described in greater detail.

Examples of specific effecient vulcanization (EV) and semi-efficient vulcanization (Semi-EV) curatives appear in, for example, NOVOR, Natural/Synthetic Rubber Crosslinkers) Bulletin No. 8006A of Hughson Chemicals, p. 9, 2-26. Another example of EV curatives appears in British Pat. No. 1,255,355; also in NR TECHNOLOGY, Rubber Developments Supplement, 1972, No. 8.

Of the sulfur containing curatives (i) (sulfur being used herein to refer elemental sulfur or sulfur donor unless otherwise stated to the contrary) Semi-EV curatives are preferred. Such Semi-EV curatives comprise an intermediate sulfur to accelerator ratio, e.g., 0.6-2.4. Preferred semi-EV curatives comprise sulfur donors and elemental sulfur.

Examples of accelerators for use in sulfur containing curatives include (a) thiazolesulfenamides such as benzothiazolesulfamides; (b) thiocarbamylsulfenamides; (c) phosphinothioylaminosulfides and (d) thiozyldisulfides. Examples of sulfur donors (also known as vulcanizing agents) are (a) dithioamines; (b) (iminodithio) thiazoles; (c) aminothiocarbamyldisulfides and (d) thiuram disulfides. Other examples of accelerators and sulfur donors are known to the art. A list of commercially available accelerators and sulfur donors appears in, for example, Rubber Worlds Blue Book entitled, *Mat., Comp. Inc. and Machinery For the Rubber Industry* (1980) by Rubber/Automotive Division of Hartman Communications, Inc., a Subsidiary of Bill Communications, Inc. (633 Third Ave., New York, N.Y. 10017). Still another list of suitably employed accelerators and sulfur donors (vulcanizing agents) appear in *Rubber Chemistry and Technology*, 53, July–August, 1980, No. 3 in the chapter entitled "S-N Compounds As Delayed Action Chemicals in Vulcanization."

Another preferred curative comprises isocyanate or blocked isocyanate. This curative is well known. Examples appear in U.S. Pat. Nos. 3,904,592; 3,882,089; 3,775,441; 3,645,980; as well as Baker, C. S. L. et al, Urethane Crosslinking of Natural Rubber, International Rubber Conference, P. G2 through G2-8 (1972).

Preferred isocyanate or blocked isocyanate containing curatives comprise a reaction product of nitrosophenol and di or polyisocyanate. A specific example is a urethane product of 2,4- toluene diisocyanate dimer and 4-nitroso-2,6-xylenol. Commercially available curing agents comprising a product of this type are are NOVOR TM 913, 920 and 924 available from Durham Chemicals Ltd., Birtley, Co., Durham, England.

Especially preferred curatives, however, for soft, heat and fatigue resistant elastomeric articles of this invention comprise a curing agent which is a combination of sulfur and isocyanate or blocked isocyanate. A combination of sulfur and isocyanate or blocked isocyanate is illustrated in U.S. Ser. No. 796,114 filed May 11, 1977, in the name of Marano (now abandoned) which is hereby herein expressly incorporated by reference. In the combined isocyanate or blocked isocyanate and sulfur systems of U.S. Ser. No. 796,114, the sulfur is used at rubber soluble levels. Additionally, the sulfur accelerator is a catalyst for the urethane.

A particularly preferred isocyanate or blocked isocyanate combination comprises (per 100 parts of elastomer) combinations of isocyanate or blocked isocyanate and sulfur used such as follows in Tables I or II:

TABLE I

| | NOVOR 924 | ZDAC[1] | Sulfur | S[2] |
|---|---|---|---|---|
| 90/10 | 6.03 | 1.8 | 0.25 | 0.05 |
| 80/20 | 5.36 | 1.6 | 0.5 | 0.1 |
| 70/30 | 4.69 | 1.4 | 0.75 | 0.15 |

TABLE I-continued

|  | NOVOR 924 | ZDAC[1] | Sulfur | S[2] |
|---|---|---|---|---|
| 60/40 | 4.02 | 1.2 | 1.0 | 0.2 |
| 50/50 | 3.35 | 1.0 | 1.25 | 0.25 |

[1]Zinc diloweralkyldithiocarbamate accelerator such as zinc dimethyldithiocarbamate.
[2]Sulfenamide accelerator such as N—t-butyl-2-benzothiazolesulfenamide.

TABLE II

|  | NOVOR 924 | TMTM[3] | Sulfur | S[4] |
|---|---|---|---|---|
| 90/10 | 4.8 | 1.4 | 0.2 | 0.04 |
| 80/20 | 4.2 | 1.3 | 0.4 | 0.08 |
| 70/30 | 3.8 | 1.2 | 0.6 | 0.12 |
| 60/40 | 3.2 | 1.1 | 0.8 | 0.16 |
| 50/50 | 2.7 | 1.0 | 1.0 | 0.20 |

[3]Tetramethylthiuram monosulfide accelerator.
[4]Sulfenamide accelerator such as N—t-butyl-2-benzothiazolesulfenamide.

In Tables I and II, the NOVOR 924 may be replaced in part e.g., 50% by weight by toluene diisocyanate dimer.

A particularly preferred sulfur-urethane range is between the 90/10 and 70/30, listed above in Tables I and II, NOVOR 924 to sulfur.

Besides elastomer, isobutylene polymer, reinforcing particulate, and curatives for the elastomer, the elastomeric articles of the invention may desirably also include still other ingredients. Examples of such ingredients are antioxidants (e.g., polymerized quinolines, hindered amines, phenols), dessicants (e.g., calcium oxide), process oils, cure inhibitors or modifiers and the like known in the art.

The elastomeric articles of this invention may be compounded using conventional equipment. It is important, however, to intimately admix the isobutylene polymer, the elastomer and other ingredients. This may be achieved, for example, on two roll rubber mills, Banbury mixers and mill and mixer combinations. The elastomer component preferably is admixed with the isobutylene polymer in a Banbury mixer prior to incorporation of the curing system. Particulates are normally admixed in the Banbury before curative addition. Thereafter, the curing agents are added, on a mill or in the Banbury. The curatives are preferably added at a temperature below about 120° C., e.g., 60°-80° C.

Once compounded, the elastomeric article may be cured at any convenient temperature; a preferred range for curing, however, is between about 120°-190° C., more preferably 150°-180° C. Cure time is preferably at least about 80%, more preferably at least about 90% of the time to reach maximum torque development on, for example, a Monsanto oscillating disc rheometer (ASTM-D2084-71T). Temperatures above about 160° C. during cure enhance physical properties including fatigue life of elastomeric articles of this invention. Enhanced physical properties at higher cure temperatures indicate that morphology plays a role in preparation of soft, fatigue resistant elastomeric articles of this invention.

Applications for elastomeric articles of this invention are diverse, as previously mentioned. For automotive suspension bushings, the elastomeric articles of this invention preferably are compounded to have constant energy fatigue life (see examples for description) of at least about 60 kilocycles, e.g., 75 kilocycles. Shore A hardness (ASTM D2240) below about 55, e.g., 40–50; and compression set (D395 (Method B), 22 hours at 150° C.) below about 50%, more preferably below about 35%.

The following examples illustrate embodiments of this invention; the invention, of course, is not limited to these embodiments, but, rather, embodiments within the scope of claims hereinafter presented.

EXAMPLE 1

The natural rubber (NR) used in this example was SMR-SL. The polyisobutylene (PIB) was obtained from Exxon Chemical Company. The PIB (Vistanex MM L-80 or L-140) had respective Flory viscosity average molecular weights of $1 \times 10^6$ and $2.1 \times 10^6$, according to "Vistonex Polyisobutylene Properties and Applications", Exxon Chemical Company, 1974. Compounds R-1 and R-2 (unknown formulations) were obtained from suppliers of front automotive bushing compounds. They are believed representative of commercially used production compounds. Ingredients listed in Table 1A below were mixed in a Banbury mixer (Model BR) using a six minute mixing schedule to make elastomeric goods of this invention. The curatives were added on a cooled 200×400 mm two roll mill. Cure properties were determined on an oscillating disk rheometer.

Sample sheets (150×150×2 mm) were molded according to ASTM D3182; compression set buttons (28 mm diameter and 13 mm thickness) were made according to ASTM D395. Specimens were cured to 95% of optimum cure as determined using the oscillating disk rheometer. Tensile and tear specimens were die cut from the sheets with a punch press. Fatigue specimens (rings) were cut from the sheets using a two bladed fly cutter. The rings had an i.d. of about 26 mm and wall thickness of approximately 0.7 mm.

TABLE 1A

|  | R-1457 | R-1414 | R-1445 | R-1415 | R-1444 |
|---|---|---|---|---|---|
| SMR-5L | 100 | 100 | 100 | 100 | 100 |
| Vistanex L-140[1] | — | — | 10 | 20 | 40 |
| Vistanex L-80[2] | 20 | — | — | — | — |
| N-765[3] | 34 | 34 | 34 | 34 | 34 |
| Zinc Oxide | 5 | 5 | 5 | 5 | 5 |
| Stearic Acid | 2 | 2 | 2 | 2 | 2 |
| Agerite Resin D[4] | 2 | 2 | 2 | 2 | 2 |
| Santoflex 13[5] | 1 | 1 | 1 | 1 | 1 |
| Dutrex 419[6] | 5 | 5 | 5 | 5 | 5 |
| Durax[7] | 0.5 | 0.5 | 0.5 | 0.5 | 0.5 |
| Sulfur | 2.5 | 2.5 | 2.5 | 2.5 | 2.5 |
| Tensile (MPa) | 20.6 | 25.1 | 21.3 | 20.6 | 16.4 |
| Elong. (%) | 620 | 600 | 630 | 620 | 630 |
| Tear (KN/m) | 47.7 | 63.5 | 60.9 | 47.7 | 35.4 |
| Hardness (Shore A) | 42 | 44 | 43 | 42 | 40 |

[1]Polyisobutylene having a viscosity average molecular weight (Flory) of about 2.1 million available from Exxon Chemical.
[2]Polyisobutylene having a viscosity average molecular weight (Flory) of about 1.0 million available from Exxon Chemical.
[3]Carbon black.
[4]Polymerized 1,2 dihydro 2,2,4-trimethylquinoline.
[5]N—(1,3-dimethylbutyl)-N—phenyl-p-phenylenediamine.
[6]Process oil.
[7]N—cyclohexyl-2-benzothiazole-sulfenamide.

CL Test Methods

Tensile strength and elongation at break were determined according to ASTM D412 (die C) and tear strength according to ASTM D624 (razor notch die B). Heat aging of samples was carried out in a ventilated air circulating oven for two hours at 150° C.

Compression set testing was done according to ASTM D395 (method B) on compression set buttons. The test conditions were 22 hours at 125° C. under 25% compression in a ventilated, air circulating oven.

Hardness of the vulcanizate was measured according to ASTM D2240 after a 30 second relaxation using a Shore A durometer.

Dynamic mechanical properties were determined in compression using compression set buttons on an Instron 1350 servohydraulic test machine. The specimen was confined between two parallel plates with 150 grit sandpaper on the plates to prevent slippage. To simulate the strain conditions typically seen by a suspension mount, the buttons were prestrained to 30% compression and allowed to relax under load 15 minutes at the test temperature. The sinusoidal strain of ±1% was superimposed at a frequency of 10 Hz. Test temperatures ranged from −40° to 100° C. and the samples were soaked at least ½ hour at the temperature before applying the prestrain. Prior to any testing, each button was preconditioned by applying a 40% compressive strain. The elastic and storage moduli were then obtained from the Lissajou figures obtained by plotting load versus strain.

Fatigue life measurements were made using the Instron servohydraulic tester and ring specimens. The rings were suspended from two spindles, one attached to the load cell and the other to the hydraulic actuator. The spindles were lubricated with glycerin to insure that abrasion did not contribute to the failure of the rings. The test frequency was 3 Hertz; failure was defined as breaking of the ring. The strain energy of any particular cycle was determined from the stress-strain curve recorded on an X-Y plotter.

The ring fatigue test described above approximates an equal energy input by using a constant strain test. The test strain in this test was chosen so that the input energy at the beginning of the test was the same for each material. The energy input to the specimen decreased during the test. This resulted primarily from stress softening of the elastomer; a small amount resulted from crack formation and propagation. The behavior was similar among the materials tested. A strain energy input of 1.4 mJ/mm$^3$ was chosen as the test condition for surveying the effect of modulus on fatigue life. Under these conditions, a commercially available natural rubber compound of 60 Shore A durometer hardness has a fatigue life of 60 Kc.

Figure 1:
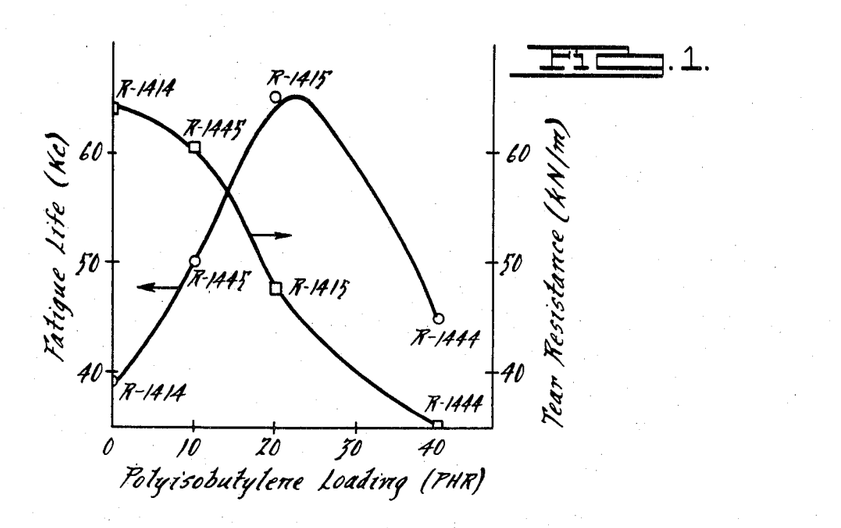
FIG. 1 graphically illustrates Example 1 data in which polyisobutylene loading is plotted against fatigue life (constant energy) and against tear resistance.

FIG. 1 shows the effect of various amounts of polyisobutylene (compounds other than 1457) on fatigue and tear strength. Tear strength monotonically decreases with an increase in polyisobutylene; this behavior is characteristic of several other physical properties including tensile strength and hardness.

A comparison of compound 1415 with compound 1457 in Table 1B shows that the higher molecular weight polyisobutylene gives better fatigue life.

TABLE 1B

| Compound | Molecular Wgt. | Hardness (Shore A) | Fatigue Life (Kc) |
| --- | --- | --- | --- |
| 1415 | 2.1 × 10$^6$ | 42 | 65 |
| 1457 | 1.0 × 10$^6$ | 40 | 31 |

Table 1C below shows the effect of cure temperature on hardness and fatigue.

TABLE 1C

| Compound | Cure Temp. (°C.) | Hardness (Shore A) | Fatigue (Kc) |
| --- | --- | --- | --- |
| 1415 | 130 | 46 | 74 |
| 1415 | 150 | 42 | 65 |

TABLE 1C-continued

| Compound | Cure Temp. (°C.) | Hardness (Shore A) | Fatigue (Kc) |
| --- | --- | --- | --- |
| 1415 | 170 | 35 | 61 |

Figure 2:
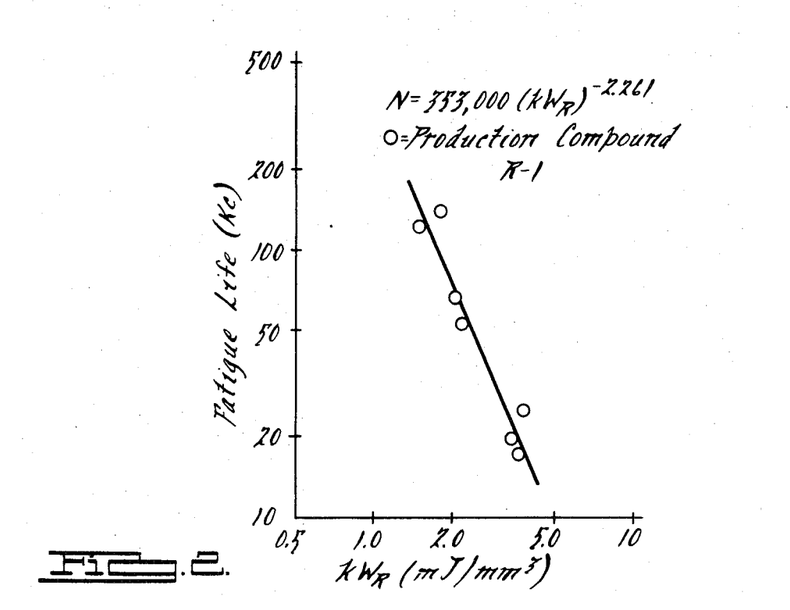
FIGS. 2 and 3 graphically illustrate fatigue life over a range of input energies for a production compound, R-1, and a compound of this invention, R-1415.
Figure 3:
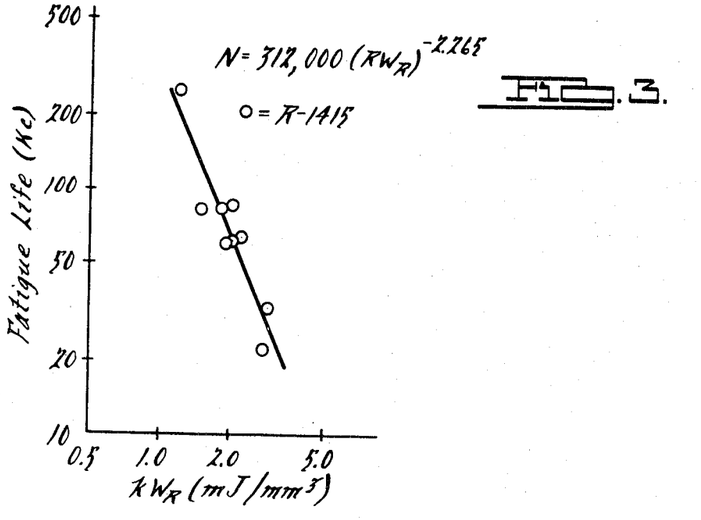

Fatigue life is dependent upon the input energy and the amount of strain induced crystallization which occurs in the elastomer. A relationship between fatigue life, input energy, flaw size and extent of crystallization is (Payne and Whittaker, Rubber Chem. Technol. 45, 1043 (1972)):

$$N = \frac{G}{2(2kW)^n C_0^{n-1}}$$

wherein N is the fatigue life, G is the cut growth constant, k a varying function of strain, W the strain energy as measured from the retraction stress-strain curve, Co is the initial flaw size, and n is a constant which depends upon the extent of strain crystallization. n has values of 2.0 for crystallizing rubbers like NR. A comparison of the fatigue life behavior of a production compound (R-1) and a NR/PIB blend was made over a range of input energies from 0.7 to 2.9 mJ/mm$^3$. The results are shown in FIGS. 2 and 3. (FIG. 2 shows the production compound results; FIG. 3 shows 1415 compound results). From a linear regression analysis of the data, the slopes (−n) are both the same, +2.3.

Figure 4:
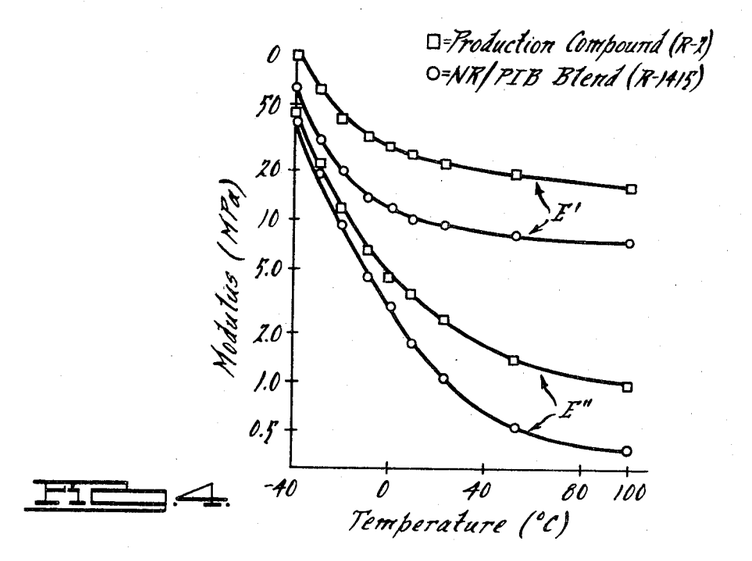
FIG. 4 graphically illustrates dynamic mechanical properties of a production compound R-1 and a compound of this invention.
Figure 5:
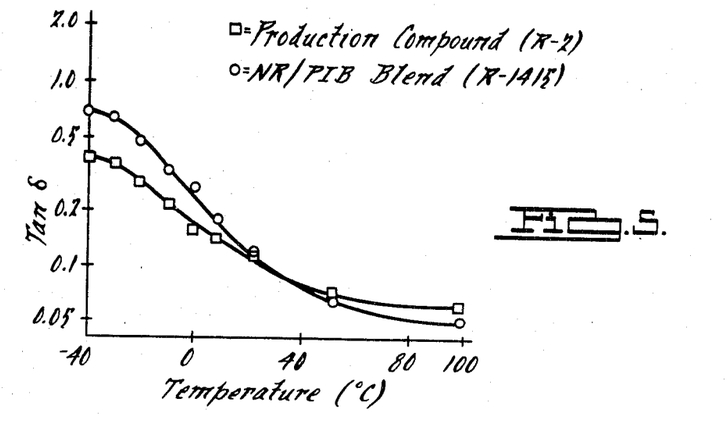
FIG. 5 graphically illustrates tan delta over a range of temperatures for the compounds in FIG. 4.
Figure 6:
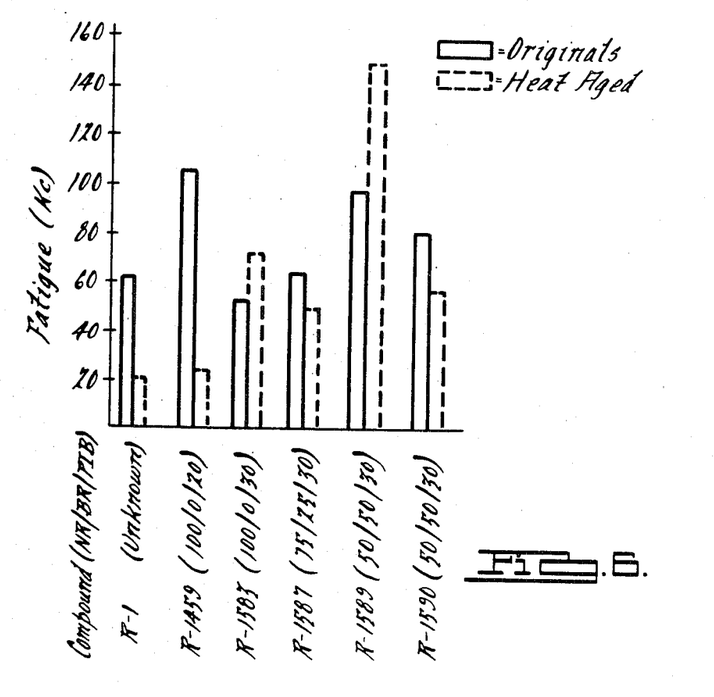
FIGS. 6-9 graphically illustrate properties of a production compound and compounds made in accordance with this invention.
Figure 7:
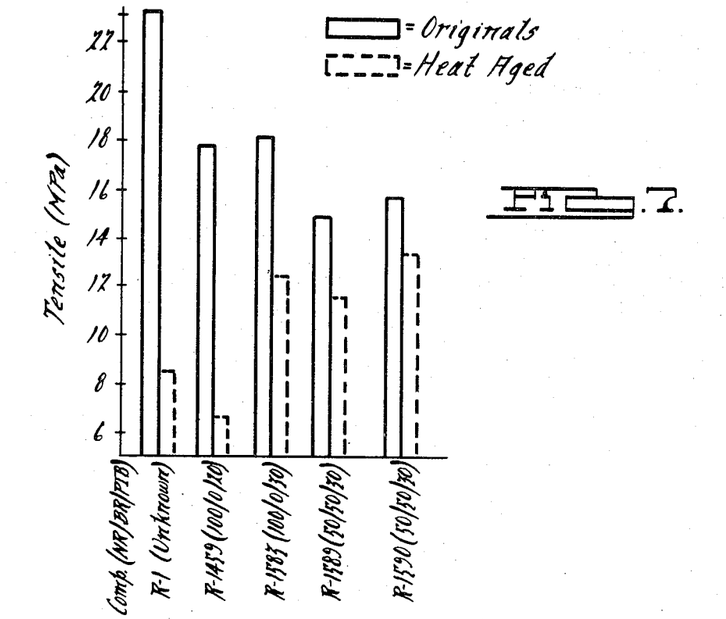
Figure 8:
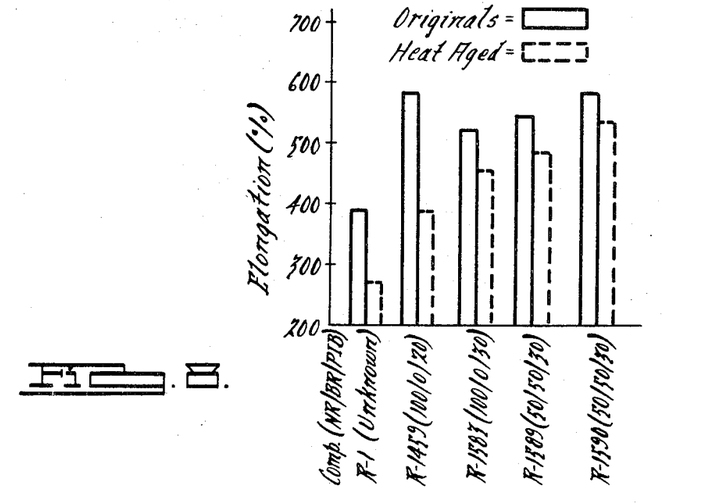
Figure 9:
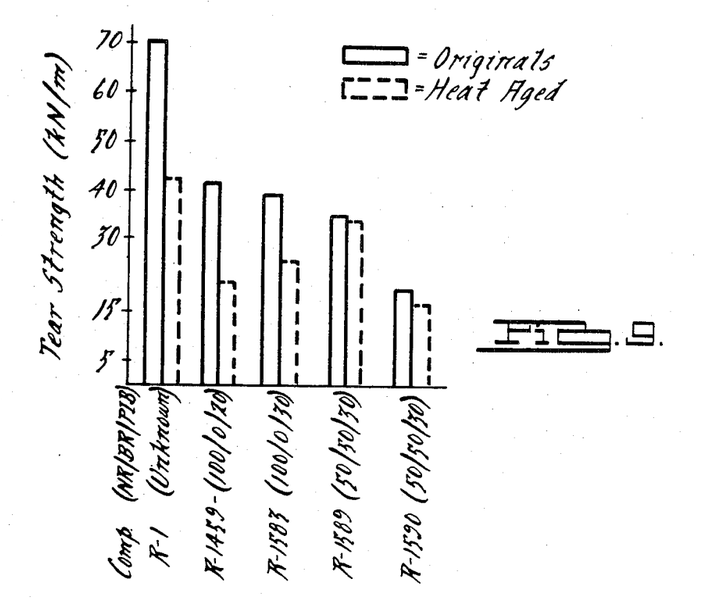

To further characterize the NR/PIB blend, a study of the dynamic mechanical properties, thermal and oxidative stability and compression set were undertaken. A comparison of the dynamic mechanical properties of a production compound (R-2) and the NR/PIB blend as a function of temperature are shown in FIGS. 4 and 5. The plot (FIG. 4) of elastic modulus (E') shows that the blend is dynamically softer than the production compound over the entire temperature range. The plots in FIGS. 4 and 5 also show that the blend exhibits a more pronounced temperature sensitivity than the production compound. (The squares are data points for the production compound, the circles are data points for compound R-1415.)

Table 1D summarizes the data on the compression set and thermal and oxidative stability of the blend and the two production compounds.

TABLE 1D

HEAT AGED PHYSICAL PROPERTIES AND COMPRESSION SET DATA FOR TWO PRODUCTION COMPOUNDS (R-1 AND R-2) AND THE NR/PIB BLEND

| | Tensile Strength, MPa | | Tear Strength KN/m | | Compression Set, % 22 hrs @ 125° C. |
| --- | --- | --- | --- | --- | --- |
| | Unaged | Heat Aged 2 hrs @ 150° C. | Unaged | Heat Aged 2 hrs @ 150° C. | |
| R-1 | 27.2 | 9.2 | 85.0 | 52.5 | 38.7 |
| R-2 | 24.1 | 6.8 | 77.9 | 47.3 | 50.8 |
| 1415 | 16.9 | 6.0 | 40.2 | 22.6 | 71.4 |

Figure 14:
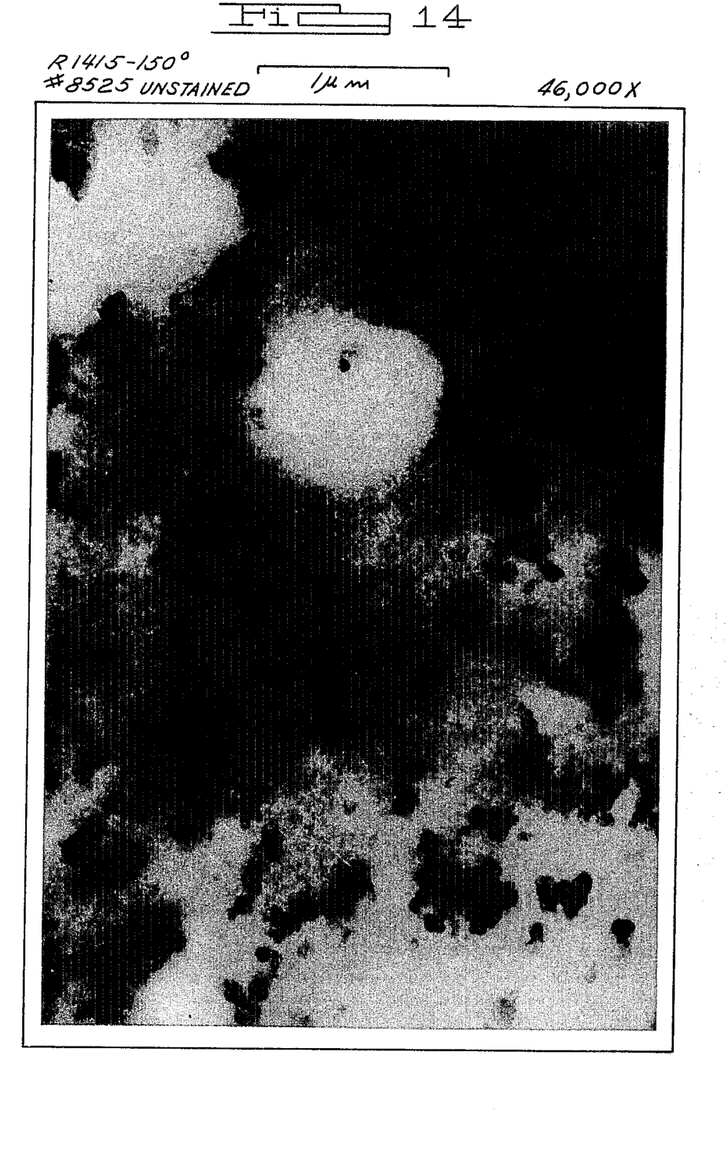
FIG. 14 is a photomicrograph of unstained R-1415, a compound of this invention at 46,000x.
Figure 15:
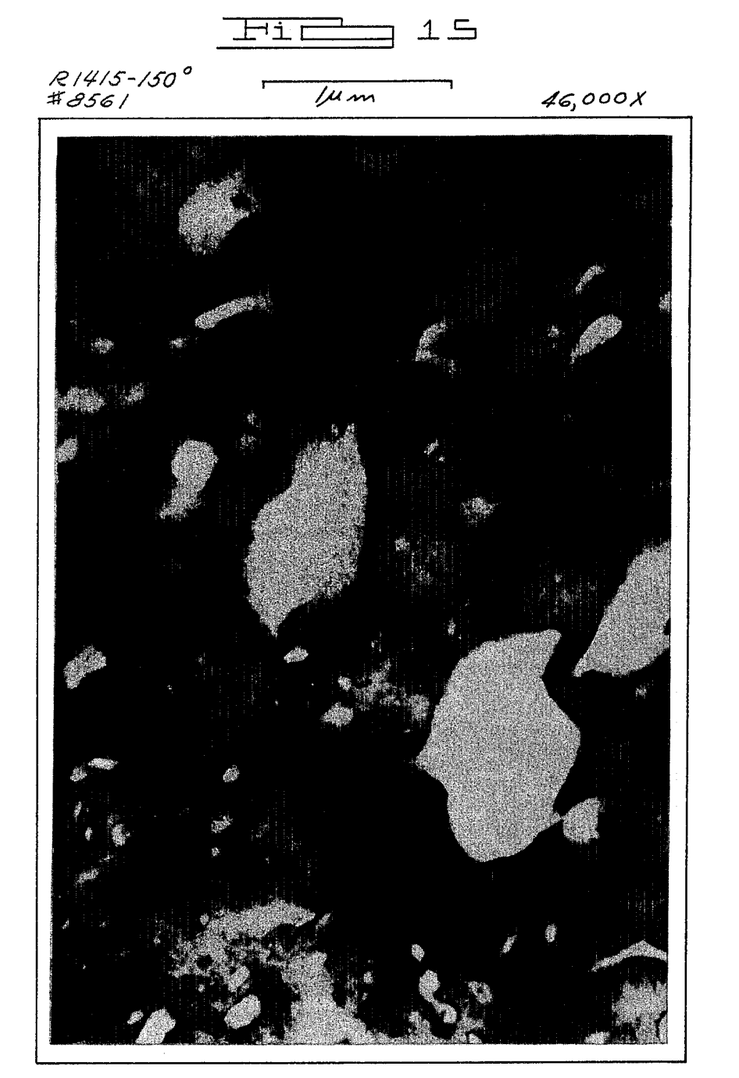
FIG. 15 is a photomicrograph of R-1415, stained to color double bonds. The white particles are polyisobutylene. The photomicrograph is at 46,000x.

Electron microscopic analysis of R-1415 shows that the isobutylene polymer is a discrete phase of particles below 2 micrometers in diameter as is seen in FIG. 15; FIG. 14 is a section as in FIG. 15, but without any stain. Both are at 46,000×.

EXAMPLE 2

The natural rubber used in this example was SMR-5L. The polyisobutylene (PIB) was Vistanex MM L-140, described previously. The polybutadiene (BR) was Goodyear Tire and Rubber Company Budene 1207; it had a cis-content of 98% by weight. The natural rubber compound R-1 was a front suspension bushing from a commercial manufacturer.

Ingredients listed in Table 2 were mixed in a Banbury mixer (BR) using a six minute, upside down mixing schedule. The cure ingredients were added on a cooled 200×400 mm two roll mill. Vulcanization parameters were determined by means of an oscillating disk rheometer. The compounds were molded and cured to 95% optimum cure at 150° C. or 170° C.

Sample sheets (150×150×2 mm) were molded according to ASTM D3182 and compression set buttons (28 mm diameter by 13 mm thick) according to ASTM D395. Tensile, tear and ring specimens for fatigue testing were cut from the cured sheets using a die and punch press. A smaller ring specimen used for obtaining the energy of the fatigue test was cut from the cured sheets using a two bladed fly cutter.

Tensile strength and elongation were determined at room temperature according to ASTM D412 (die C) and tear strength according to ASTM D624 (die B). Testing was done at 500 mm per minute on an electromechanical tester.

Compression set testing was done according to ASTM D395 (method B). The test specimens were under 25% compression for 22 hours at 125° C. in a ventilated, air circulating oven.

Hardness was measured according to ASTM D2240 on the unaged and heat aged samples using a Shore A durometer. A 30 second relaxation was allowed before the final reading.

Fatigue measurements were made using a Wallace-MRPRA fatigue tester and ring specimens (O.D. 52.6 mm, I.D. 44.6 mm). The rings were lubricated with glycerine to prevent abrasion and mounted on four moving pulleys, two on the moving frame and two on the stationary frame. The rings were cyclically deformed in tension to a strain amplitude of either 162.5 or 175% at 5 Hz until failure. Failure is defined as the breaking of the ring. The reported fatigue life for each compound is the average of the results from 12 specimens.

The strain energy of the fatigue test was determined using the Instron 1350 servohydraulic test machine and ring specimens cut from ASTM test sheets. The rings were lubricated with glycerin and suspended from two spindles, one attached to the hydraulic actuator and the other to the load cell. The strain energy was then calculated using the stress-strain curve recorded on an X-Y plotter. A strain energy input of 1.4 mJ/mm$^3$ was used as the test condition for evaluating the fatigue life.

Dynamic mechanical properties were determined in compression using compression set buttons on an Instron servohydraulic test machine. The samples were confined between two parallel plates with 150 grit sandpaper attached to the plates to prevent specimen slippage. A 40% compressive strain was applied to the specimens several times to minimize the ribber-filler effects (Mullins effect). A 30% static compressive strain was applied and then the specimen was allowed to relax under load for 15 minutes at the test temperature. A sinusoidal strain of ±1% was superimposed upon the static strain at a frequency of 10 Hz. The samples were tested over a temperature range of −40° C. to 100° C.

TABLE 2A

| | R-1459 | R-1466 | R-1540 | R-1541 | R-1570 | R-1571 | R-1572 | R-1573 | R-1583 | R-1587 | R-1588 | R-1589 | R-1590 |
|---|---|---|---|---|---|---|---|---|---|---|---|---|---|
| Natural Rubber | 100 | 100 | 100 | 100 | 100 | 100 | 100 | 100 | 100 | 75 | 50 | 50 | 50 |
| Polyisobutylene | 20 | 20 | 20 | 20 | 20 | 20 | 20 | 20 | 30 | 30 | 30 | 30 | 30 |
| Polybutadiene | — | — | — | — | — | — | — | — | — | 25 | 50 | 50 | 50 |
| Carbon Black | 50 | 40 | 50 | 50 | 25 | 40 | 40 | 40 | 50 | 50 | 50 | 45 | 45 |
| Hydrated Silica | — | — | — | — | 10 | — | — | — | — | — | — | — | — |
| Zinc Oxide | 5 | 5 | 5 | 5 | 5 | 5 | 5 | 5 | 5 | 5 | 5 | 5 | 5 |
| Stearic Acid | 2 | 2 | 2 | 2 | — | 2 | 2 | 2 | 2 | 2 | 2 | 2 | 2 |
| Polymerized 1,2-dihyrdo-2,2,4-trimethylquinoline | 2 | 2 | 2 | 2 | 2 | 2 | 2 | 2 | 2 | 2 | 2 | 2 | 2 |
| N—(1,3-dimethyl-butyl)-N—phenyl-p-phenylenediamine | 1 | 1 | 1 | 1 | 2 | 2 | 2 | 2 | 1 | 1 | 1 | 1 | 1 |
| Process Oil (Dutrex 419) | 5 | 5 | 5 | 5 | — | 5 | 5 | 5 | 5 | 5 | 5 | 5 | 5 |
| 2-Mercapto-benzimidazole | — | — | — | — | 1 | — | — | — | — | — | — | — | — |
| Zinc 2-ethylhexoate | — | — | — | — | 2 | — | — | — | — | — | — | — | — |
| Sulfur | 2.50 | 0.40 | 0.40 | 0.60 | 0.40 | 0.40 | 0.60 | 1.45 | 0.40 | 0.40 | 0.40 | 0.40 | 0.60 |
| N—cyclohexyl-2-benzothiazole-sulfenamide | 0.50 | — | — | — | — | — | — | — | — | — | — | — | — |
| N—t-butyl-2-benzothiazole-sulfenamide | — | 0.08 | 0.08 | — | 0.08 | 0.08 | — | 0.25 | 0.80 | 0.80 | 0.80 | 0.80 | — |
| N—oxydiethylene-2-benzothiazole-sulfenamide | — | — | — | 0.75 | — | — | 0.75 | — | — | — | — | — | 0.70 |
| Tetramethythiuram monosulfide | — | 0.90 | 0.90 | — | 0.90 | 0.90 | — | 0.45 | 0.90 | 0.90 | 0.90 | 0.90 | — |
| N—oxydiethylenethio-carbamyl-N'—oxydi-ethylenesulfenamide | — | — | — | 1.50 | — | — | 1.50 | — | — | — | — | — | 1.40 |
| Urethane Crosslinker (NOVOR 924) | — | 4.20 | 4.20 | — | 4.20 | 4.20 | — | 2.10 | 4.20 | 4.20 | 4.20 | 4.20 | — |

The specimens were preconditioned at the test temperature for 30 minutes prior to applying the static prestrain. The elastic and storage moduli were determined from the lissajou figures obtained by plotting the load versus strain.

Heat aging of the fatigue samples was done according to ASTM D573-67 for two hours at 150° C. in a ventilated, air circulating oven.

Table 2B shows results obtained from testing the production compound R-1 and R-1459. As can be seen, R-1459 is softer and has superior fatigue. R-1459, however, has less thermal stability than R-1.

Table 2C shows results of incorporating polyisobutylene into various sulfur, urethane and mixed sulfur and urethane cured compounds. Compounds 1587, 1588, 1589 and 1590 have added polybutadiene.

TABLE 2B
PROPERTIES OF R-1459 AND THE PRODUCTION COMPOUND (R-1)

|  | R-1459 | R-1 |
|---|---|---|
| Fatigue (Kc) | 105 | 62 |
| Hardness (Shore A) | 44 | 66 |
| Compression Set (%) | 70 | 39 |
| Heat Aged Tensile (MPa) | 6.6 | 8.5 |
| Heat Aged Elongation (%) | 385 | 270 |
| Heat Aged Tear Strength (KN/m) | 21.3 | 42.5 |

TABLE 2C

|  | Fatigue (Kc) | Hardness (Shore A) | Compression Set (%) |
|---|---|---|---|
| R-1540 | 33 | 47 | 31 |
| R-1540 | 35 | 47 | 29 |
| R-1543 | 38 | 51 | — |
| R-1466(170)[1] | 44 | 41 | 33 |
| R-1570 | 41 | 40 | 42 |
| R-1571 | 40 | 41 | 55 |
| R-1572 | 43 | 46 | 59 |
| R-1573 | 48 | 45 | 62 |
| R-1459 | 105 | 44 | 70 |
| R-1587 | 63 | 46 | 33 |
| R-1588 | 100 | 47 | 28 |
| R-1589 | 97 | 45 | 27 |
| R-1590 | 80 | 45 | — |
| R-1583 | 53 | 44 | 31 |

[1]Cured at 170° C.

FIGS. 6-9 show graphically a comparison between the production compound and compounds with varying amounts of polybutadiene (BR). Results obtained on heat aging appear as broken lines; results obtained without heat aging appear as solid lines.

Figure 10:
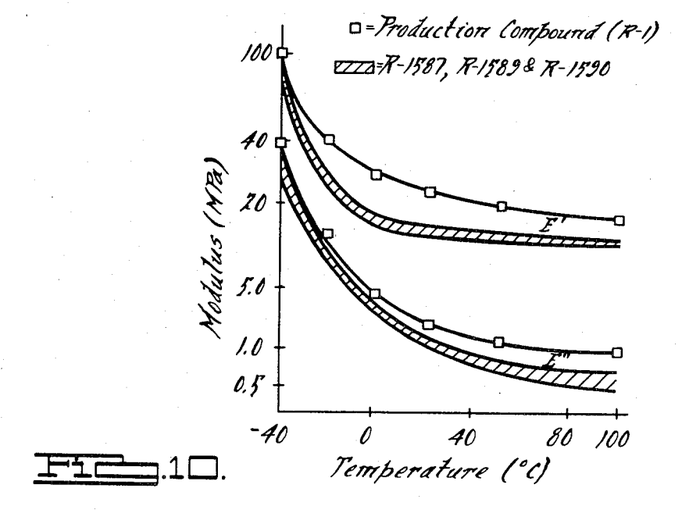
FIG. 10 graphically illustrates dynamic properties of a production compound and compounds of the invention versus temperature.
Figure 11:
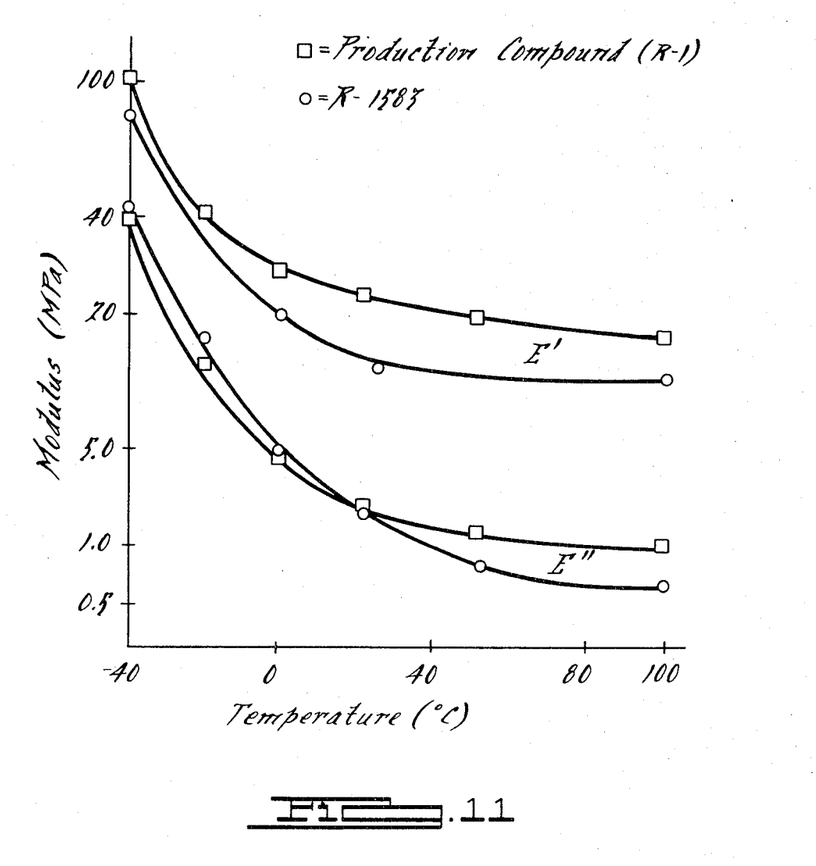
FIG. 11 graphically illustrates dynamic properties of a production compound and a compound, R-1583, of this invention.

FIG. 10 shows dynamic mechanical properties of the production compound R1 compared to a composite of compounds R-1587, 1589 and 1590 over a temperature range of 40°-100° C. The natural rubber/polybutadiene compounds of this invention exhibit low elastic modulus (E') and loss modulus (E''). The dynamic response of a compared compound without polybutadiene (R-1583) appears in FIG. 11.

Figure 12:
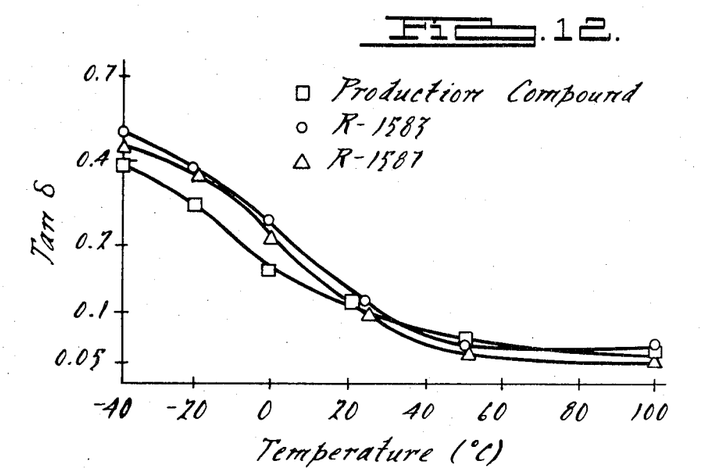
FIGS. 12 and 13 graphically illustrates tan delta for a production compound and compounds R-1583 and R-1587 (FIG. 12) and R-1589 and R-1590 (FIG. 13) of this invention.
Figure 13:
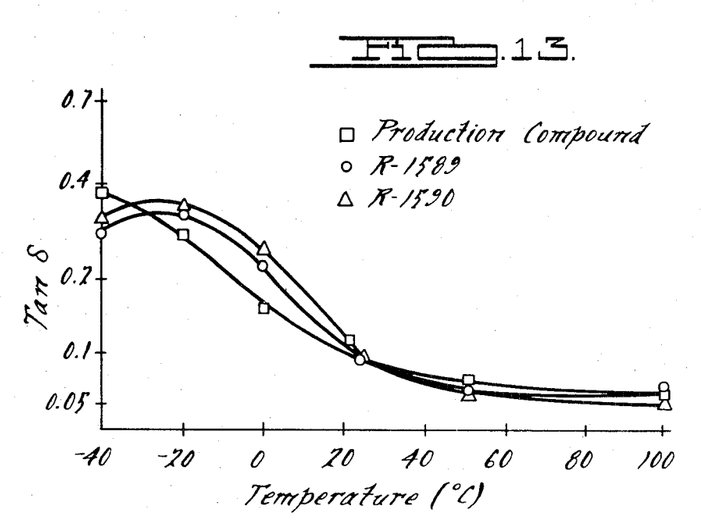

The influence of polybutadiene on dynamic mechanical response is illustrated by a plot of tan delta versus temperature in FIGS. 12 and 13 for compounds R-1, R-1583 and R-1587 and R-1, R-1589 and R-1590, respectively. As polybutadiene (BR) increases, the formation of a maximum occurs in the damping curve. The maximum is due to the lower glass transition temperature of the polybutadiene (BR).

For purposes of the heretofore specification and hereinafter claims, "conventional sulfur vulcanization" refers to cure systems in which the ratio of accelerator to sulfur is between about 0.2 and 0.5. When cured to optimum modulus by such systems, the sulfur crosslinks contain, on the average, several sulfur atoms. Only a small number of the crosslinks are monosulfidic; more crosslinks are disulfidic and still more are polysulfidic. The polysulfidic crosslinks may be of cyclic character. "Efficient vulcanization", for such purposes, refers to a method of curing to reduce the number of sulfur atoms per crosslink formed, as compared to conventional sulfur vulcanization. Efficient sulfur vulcanization may be obtained by (a) use of sulfur donor to replace elemental sulfur completely or partially, (b) use of low sulfur, high accelerator ratios in the curvatives and (c) use of accelerator blends and low sulfur. Semi effecient vulcanization, for such purposes, refers to cure systems that produce a cured elastomer intermediate in structure and thermal stability between those produced by effecient vulcanization and conventional vulcanization. Semi-effecient vulcanization uses an accelerator to sulfur ratio between about 0.6 and 2.5. The use of sulfur donor to replace a part of elemental sulfur in conventional vulcanization without altering the accelerator level is another way to provide semi-efficient vulcanization.

Also, as used herein "isocyanate or blocked isocyanate" refers to a compound having two or more functional groups selected from isocyanate and blocked, but reactive, isocyanate functional groups.

What is claimed is:

1. A soft, heat and fatigue resistant vulcanizate adapted for transmitting a load between moving mechanical parts comprising (a) 100 parts by weight crosslinked elastomer consisting essentially of (i) natural or synthetic polyisoprene rubber, and (ii) elastomeric polybutadiene made from monomers consisting essentially of butadiene at a weight ratio of (i) to (ii) of about 1:10-10:1, (b) about 10-75 parts by weight of substantially internally uncrosslinked, substantially linear polymer that (i) is made from monomers consisting essentially of isobutylene, (ii) is a strain crystallizable, elastic solid at 20° C. and (iii) has a viscosity average molecular weight (Flory) above about 1.3 million, said elastomer being crosslinked with (c) a curative comprising a curing agent selected from the group consisting of (i) a sufficient amount of sulfur to provide an efficient or semi-efficient vulcanization of said elastomer, (ii) isocyanate or blocked isocyanate in an amount sufficient to crosslink said elastomer and (iii) isocyanate or blocked isocyanate and sulfur in an amount sufficient to crosslink said elastomer and (d) 5-200 reinforcing particulate parts by weight particulate comprising carbon black wherein said polymer of (b) is dispersed throughout said elastomer of (a) in a discrete microscopic phase.

2. A vulcanizate in accordance with claim 1, wherein said curative comprises isocyanate or blocked isocyanate and sulfur.

3. A vulcanizate in accordance with claim 2, wherein said weight ratio is about 1:4-4:1.

4. A vulcanizate in accordance with claim 1, 2 or 3, wherein said substantially internally uncrosslinked polymer is polyisobutylene.

5. A vulcanizate in accordance with claim 1, wherein said polybutadiene comprises cis-polybutadiene.

6. A vulcanizate in accordance with claim 5, wherein said polyisoprene rubber is natural rubber.

7. A vulcanizate in accordance with claim 6 wherein said viscosity average molecular weight (Flory) ranges from about 1.8 to about 2.4 million.

8. A suspension bushing having a Shore A hardness below about 60; which comprises (a) 100 parts by weight crosslinked elastomer consisting essentially of (i) natural or synthetic polyisoprene rubber, and (ii) elastomeric cis-polybutadiene at a weight ratio of (i) to (ii) of about 1:4–4:1, (b) about 15–35 parts by weight of substantially internally saturated, terminally unsaturated and substantially linear polyisobutylene that is a strain crystallizable, elastic solid at 20° C. and has a viscosity average molecular weight (Flory) above about 1.5 million, said elastomer being crosslinked with (c) a curative comprising a curing agent selected from the group consisting of (i) a sufficient amount of sulfur to provide an efficient or semi-efficient vulcanization of said crosslinkable elastomer, (ii) isocyanate or blocked isocyanate in an amount sufficient to crosslink said crosslinkable elastomer and (iii) isocyanate or blocked isocyanate and sulfur in an amount sufficient to crosslink said crosslinkable elastomer and (d) reinforcing particulate comprising about 20–80 parts by weight carbon black reinforcing particulate, wherein said polymer of (b) is dispersed throughout said elastomer of (a) in a discrete microscopic phase.

9. A suspension bushing in accordance with claim 8 wherein said curative comprises sulfur and isocyanate or blocked isocyanate.

10. A suspension bushing in accordance with claim 9 wherein said substantially internally saturated, substantially internally saturated, substantially linear polymer comprises a polyisobutylene with a viscosity average molecular weight (Flory) of between about 1.9–2.1 million.

11. A suspension bushing in accordance with claim 8, wherein said suspension bushing has a Shore A hardness of about 40–50.

* * * * *